United States Patent
Adcock

(10) Patent No.: US 12,054,264 B2
(45) Date of Patent: Aug. 6, 2024

(54) ARMREST ASSEMBLY WITH HIDDEN PIVOT SHAFT AND DISCREET RETENTION

(71) Applicant: B/E Aerospace, Inc., Winston-Salem, NC (US)

(72) Inventor: Christopher Adcock, Advance, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 376 days.

(21) Appl. No.: 17/665,828

(22) Filed: Feb. 7, 2022

(65) Prior Publication Data

US 2023/0249832 A1    Aug. 10, 2023

(51) Int. Cl.
*B64D 11/06* (2006.01)

(52) U.S. Cl.
CPC ............... *B64D 11/0644* (2014.12)

(58) Field of Classification Search
CPC .................................. B64D 11/0644
See application file for complete search history.

(56) References Cited

U.S. PATENT DOCUMENTS

| | | | |
|---|---|---|---|
| 6,375,265 B1 | 4/2002 | Hübner et al. | |
| 8,534,761 B2 | 9/2013 | Saxton | |
| 9,623,972 B2 | 4/2017 | Maslakow | |
| 9,701,229 B2 | 7/2017 | Bhat et al. | |
| 10,017,256 B2 | 7/2018 | Byers et al. | |
| 10,279,917 B1 * | 5/2019 | Wilkey | B64D 11/0644 |
| 10,850,850 B2 | 12/2020 | Murnan et al. | |
| 2015/0091342 A1 * | 4/2015 | Cailleteau | B64D 11/0644 |
| | | | 297/188.08 |
| 2015/0314712 A1 | 11/2015 | Lewis | |
| 2020/0001761 A1 | 1/2020 | Tutelea et al. | |
| 2020/0055432 A1 | 2/2020 | Nonaka | |
| 2020/0122622 A1 | 4/2020 | Spencer | |
| 2021/0300568 A1 | 9/2021 | Khachane et al. | |
| 2022/0348333 A1 * | 11/2022 | Barnett | B64D 11/0644 |

FOREIGN PATENT DOCUMENTS

| | | |
|---|---|---|
| EP | 2698276 B1 | 5/2015 |
| EP | 3181450 B1 | 8/2020 |
| WO | 073715 S | 5/2010 |
| WO | 2020169344 A1 | 8/2020 |

* cited by examiner

*Primary Examiner* — Anthony D Barfield
(74) *Attorney, Agent, or Firm* — Suiter Swantz IP

(57) ABSTRACT

The present disclosure provides an armrest assembly easily installed and removed while in service, and while also maintaining a discreet connection. The armrest assembly includes a pivot block holding an armrest and rotatably coupled to a frame member, for instance a fixed seat spreader. The pivot block and frame member have mating stop block features that allow the armrest to rotate while being restrained from motion in upper and lower positions. A central shaft common to the pivot block allows for rotation. A retention pin is installed perpendicular to the axis of rotation through the spreader and is received in an annular groove formed in the shaft to retain the pivot block while allowing its rotation.

15 Claims, 7 Drawing Sheets

A FIELD AND BACKGROUND

ARMREST ASSEMBLY WITH HIDDEN PIVOT SHAFT AND DISCREET RETENTION

TECHNICAL FIELD AND BACKGROUND

The present disclosure relates generally to an armrest assembly, and more particularly, to an armrest assembly including an armrest pivot block rotatably coupled to a support member having stop block features that interact to allow rotation between upper and lower rotational limits of the armrest. A concealed pin retains the pivot block to the support member to provide a discreet connection, while also allowing a concealed pivot point and installation and removal of the armrest while in service.

Vehicle seats such as aircraft passenger seats are commonly equipped with assemblies such as armrests, tray tables, leg rests, and seat backs that are adjustable for passenger comfort and personnel use. These assemblies typically include moving parts for adjustability and stowage between uses. The components that facilitate the adjustability of such assemblies and arrangements are expected to provide long service lives.

Moving elements that are subject to more frequent use are exposed to higher wear and even abuse. For example, pivoting armrests of airline passenger seats are likely handled and adjusted several times by every passenger that uses a particular seat. An armrest may be raised and lowered for courtesy each time another passenger using a nearby seat enters and exits a seating row. A typical armrest pivots about a single mounting point in a cantilever fashion. The expectation that an armrest maintains its position once adjusted by a passenger is typically met by a pivoting joint that applies an appropriate amount of friction to permit adjustment and assure stability.

Such armrests ultimately require maintenance and repair, particularly in components where friction and movement occur and thus wear tends to accumulate. As wear occurs in the pivoting joints of armrests, it is undesirable to replace an entire passenger seat or other major assembly or even disassemble such an assembly to any great extent. Airline operators thus prefer to conduct maintenance and repair operations with as little interruption to aircraft use as feasible.

Any mounting and pivoting mechanism that attaches a pivoting element to a more fixed host structure, and that applies friction against relative movement, is likely to require maintenance and repair. It is preferable to minimize the costs of replacement parts and the required skill level for repair operations, while at once assuring a repaired mechanism is returned to an expected performance level once a maintenance operation is complete.

Therefore, what is needed is an armrest assembly easily installed, maintained, and removed while in service, while also maintaining a discreet armrest connection.

SUMMARY OF THE INVENTIVE ASPECTS

In a first aspect, according to an embodiment the present invention provides an armrest assembly including a fixed support member provided with a bore defining an axis of rotation, a pivot block provided with a shaft rotatably engaging the bore, and an armrest coupled to the pivot block. A retention pin retains the pivot block to the fixed support member. The retention pin is installed through the fixed support member, perpendicular to the axis of rotation, and is received in an annular groove formed in the shaft of the pivot block. The fixed support member and the pivot block are provided with mating stop blocks configured to limiting pivoting of the pivot block relative to the fixed support member.

In some embodiment, the fixed support member is provided with separate stop blocks diametrically opposed about the bore, the pivot block is provided with separate stop blocks diametrically opposed about the shaft, the stop blocks of the pivot block are configured to engage the stop blocks of the fixed support member in a first configuration to prevent further upward pivoting of the pivot block relative to the fixed support member, and the stop blocks of the pivot block are configured to engage the stop blocks of the fixed support member in a second configuration to prevent further downward pivoting of the pivot block relative to the fixed support member.

In some embodiments, the stop blocks of the pivot block and the stop blocks of the fixed support member are interdigitated.

In some embodiments, the armrest assembly further includes a washer disposed between the fixed support member and the pivot block, the washer positioned radially outward of the interdigitated stop blocks of the pivot block and the fixed support member.

In some embodiments, the fixed support member is a spreader defining opposing sides and the pivot block bears against one of the opposing sides.

In some embodiments, an internally threaded bore is formed in the fixed support member, wherein the retention pin is externally threaded and theadably engages in the internally threaded bore.

In some embodiments, an opening to the internally threaded bore is positioned below the armrest such that the retention pin, when installed, is concealed from view when the armrest is fully lowered.

In some embodiments, the pivot block is configured to rotate relative to the fixed support member to move the armrest between a first position in which the armrest is substantially horizontal and a second position in which the armrest is substantially vertical.

According to another aspect, the present disclosure provides an armrest assembly for use with an aircraft passenger seat. The armrest assembly includes a fixed spreader provided with a bore positioned proximate an upper end of the fixed spreader, the bore defining an axis of rotation, a pivot block provided with a shaft rotatably engaging the bore, an armrest coupled to the pivot block, a retention pin retaining the pivot block to the fixed spreader, the retention pin installed through the fixed spreader, perpendicular to the axis of rotation, and received in an annular groove formed in the shaft of the pivot block, and the fixed spreader and the pivot block provided with mating stop blocks limiting pivoting of the pivot block relative to the fixed spreader.

BRIEF DESCRIPTION OF THE DRAWINGS

Implementations of the inventive concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTION

Figure 1:
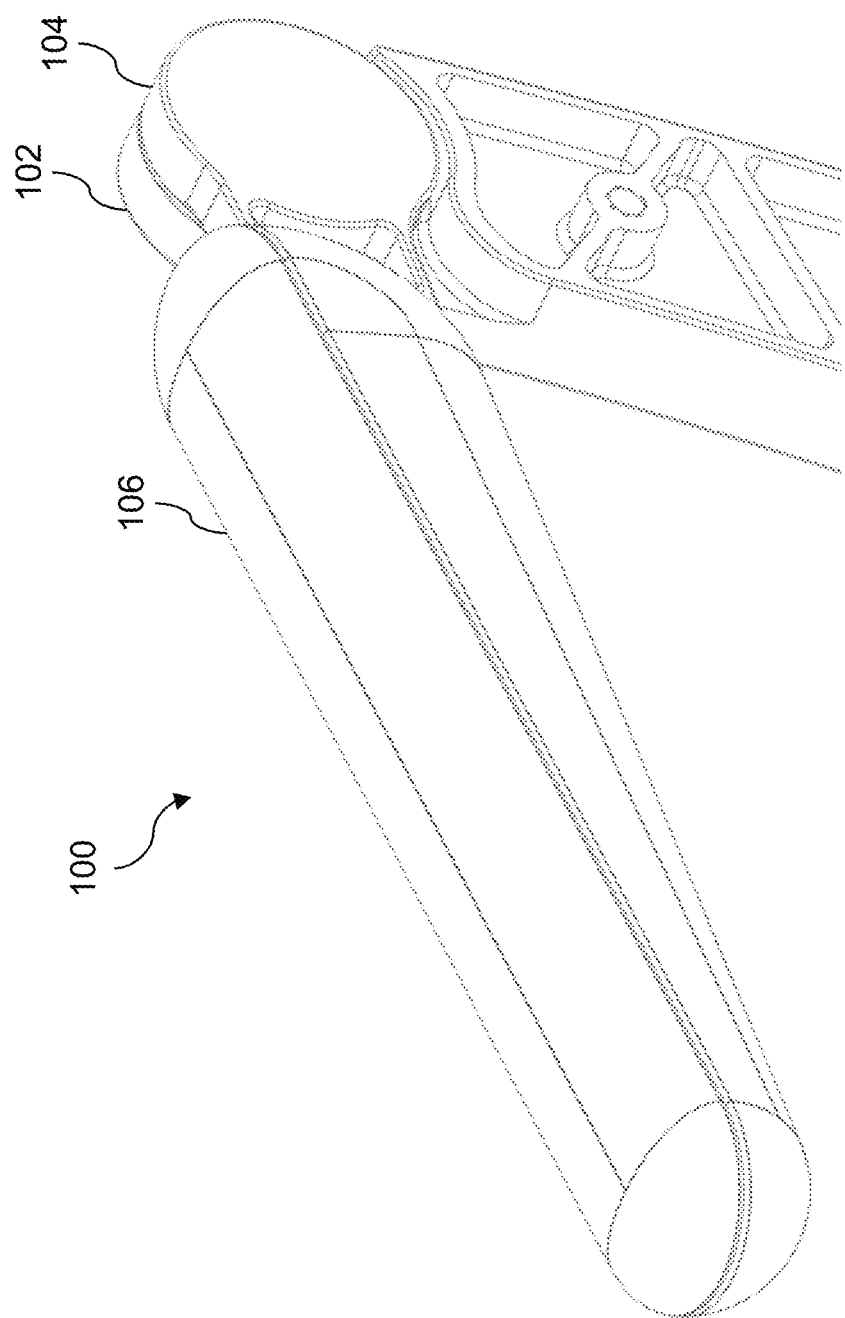
FIG. 1 is a perspective view of an armrest assembly according to an embodiment of the present disclosure, illustrating a pivot block side of the assembly.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly speaking, embodiments of the inventive concepts disclosed herein are directed to armrest assemblies easily installed and removed while in service, while also maintaining a discreet connection. In an embodiment, the armrest assembly includes a pivot block that holds the armrest itself and is coupled to a support member, for instance a fixed seat spreader. The pivot block and spreader have mating stop block features that interact to allow the armrest to rotate while being restrained from motion in the upper and lower positions. A central shaft common to the pivot block allows for rotation. A retention pin is installed perpendicular to the axis of rotation through the spreader and grooved central shaft. The groove in the shaft retains the pivot block assembly while allowing for rotation.

Figure 2:
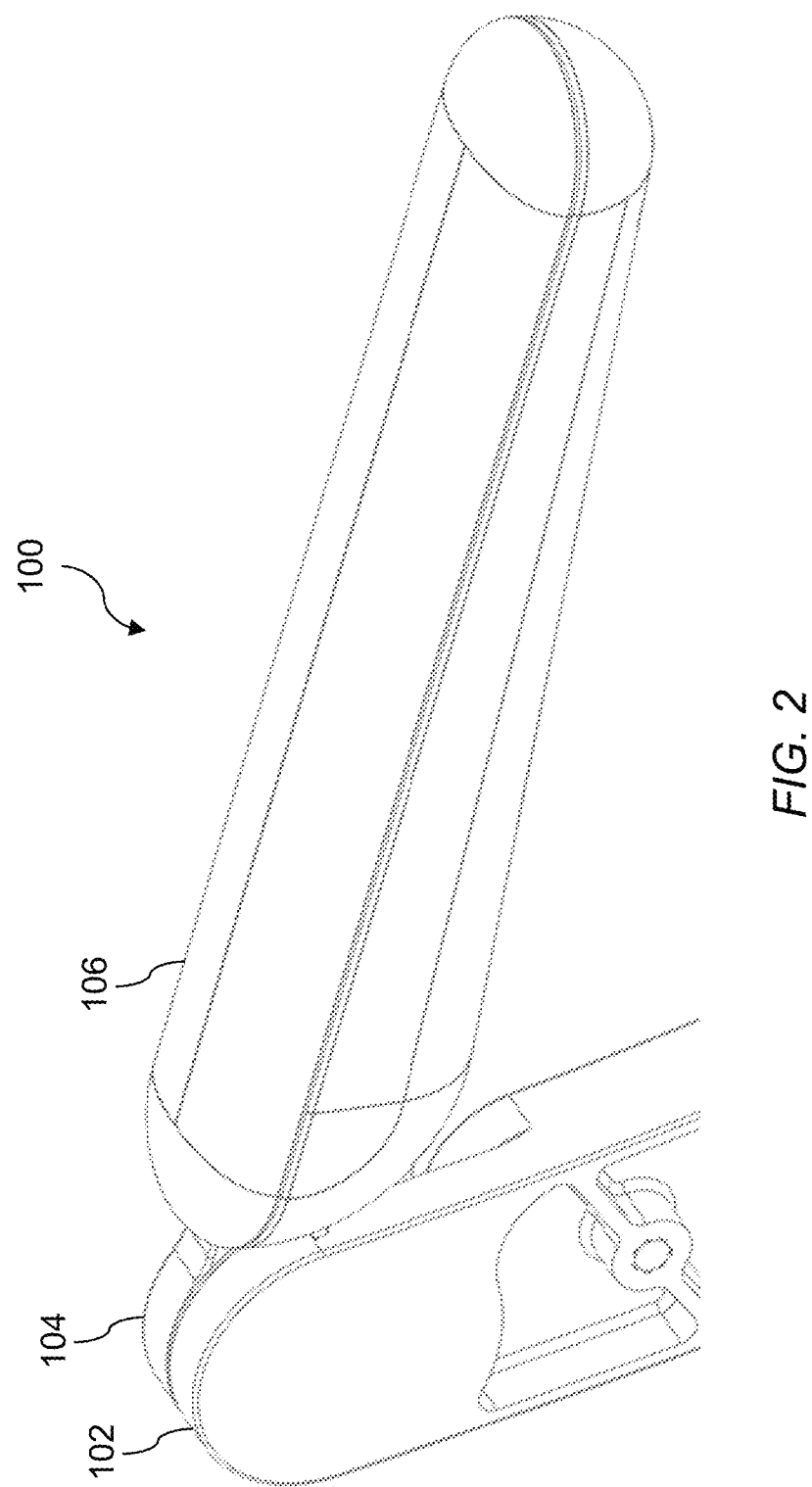
FIG. 2 is a perspective view of the armrest assembly illustrating a spreader side of the assembly.

Referring to FIGS. 1 and 2, a non-limiting example of an armrest assembly is shown generally at reference numeral 100. As compared to conventional clevis type armrests where the armrest captures the mating feature on both sides, in the present armrest assembly 100 there is no visible pivot point, thus providing an elegant retention solution.

Components of the armrest assembly 100 generally include a fixed frame member 102, a pivot block 104 rotatably coupled to the fixed frame member 102, and an armrest 106 coupled to and carried by the pivot block 104. In a particular embodiment in which the armrest assembly is installed on an economy class type aircraft passenger seat, the fixed frame member 102 may be a spreader as shown. Known to those skilled in the art of aircraft passenger seats, a spreader is a vertically oriented support member disposed at the ends of a seat row and between adjacent seats that functions to receive lateral beam tubes supporting the seat bottoms. In some spreader configurations, a lower portion of the spreader forms legs while the upper portion supports a pivotally attached armrest in a clevis type construction as mentioned above. The spreader is typically constructed from aluminum for strength and weight savings and may be foraminous for further weight savings.

Figure 8:
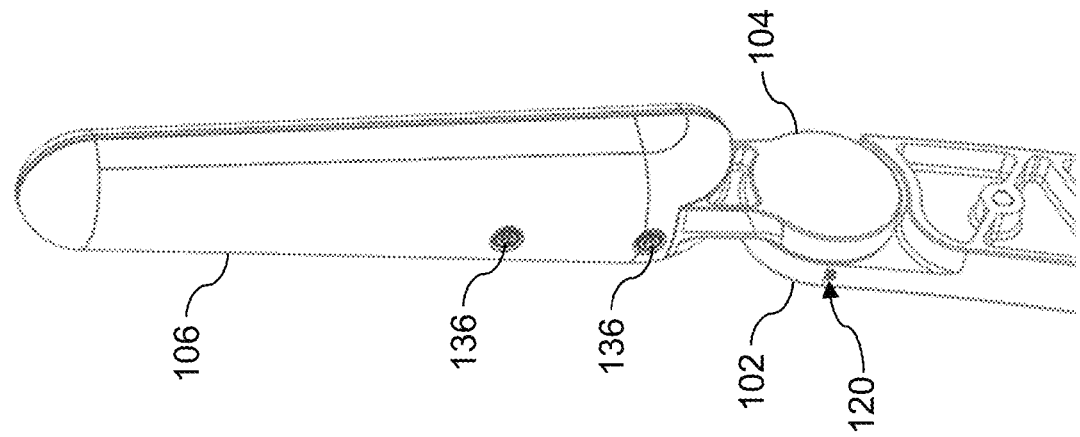
FIG. 8 is a perspective view of the armrest assembly illustrating the fully raised position of the armrest.

The armrest is configured to pivot between a use position as shown in FIGS. 1 and 2, and a stowed position as shown in FIG. 8. In the use position, the armrest 106 is oriented substantially, and in the stowed position the armrest is oriented substantially vertical. The upper end of the spreader is typically positioned to the side of its respective seat back such that the armrest 106, when stowed, resides along the seat back and out of the way to facilitate seat ingress and egress. Although not limiting, the typical range of motion of the armrest is about 90 degrees and the armrest is moved between the stowed and deployed positions manually. The armrest 106 is elongated and may include padding or a padded arm cap.

Figure 3:
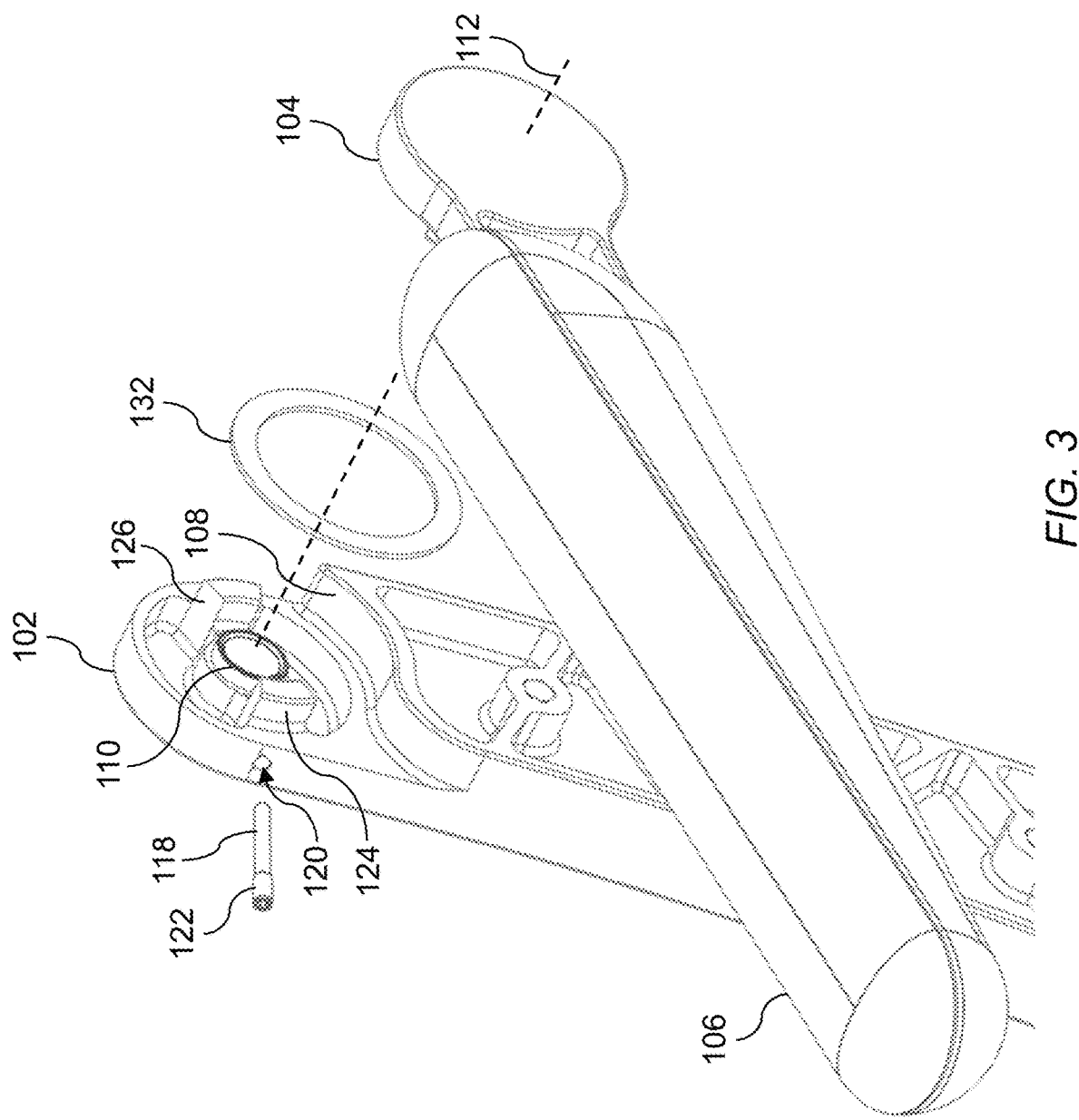
FIG. 3 is an exploded perspective view of the armrest assembly illustrating the fixed support member features.
Figure 4:
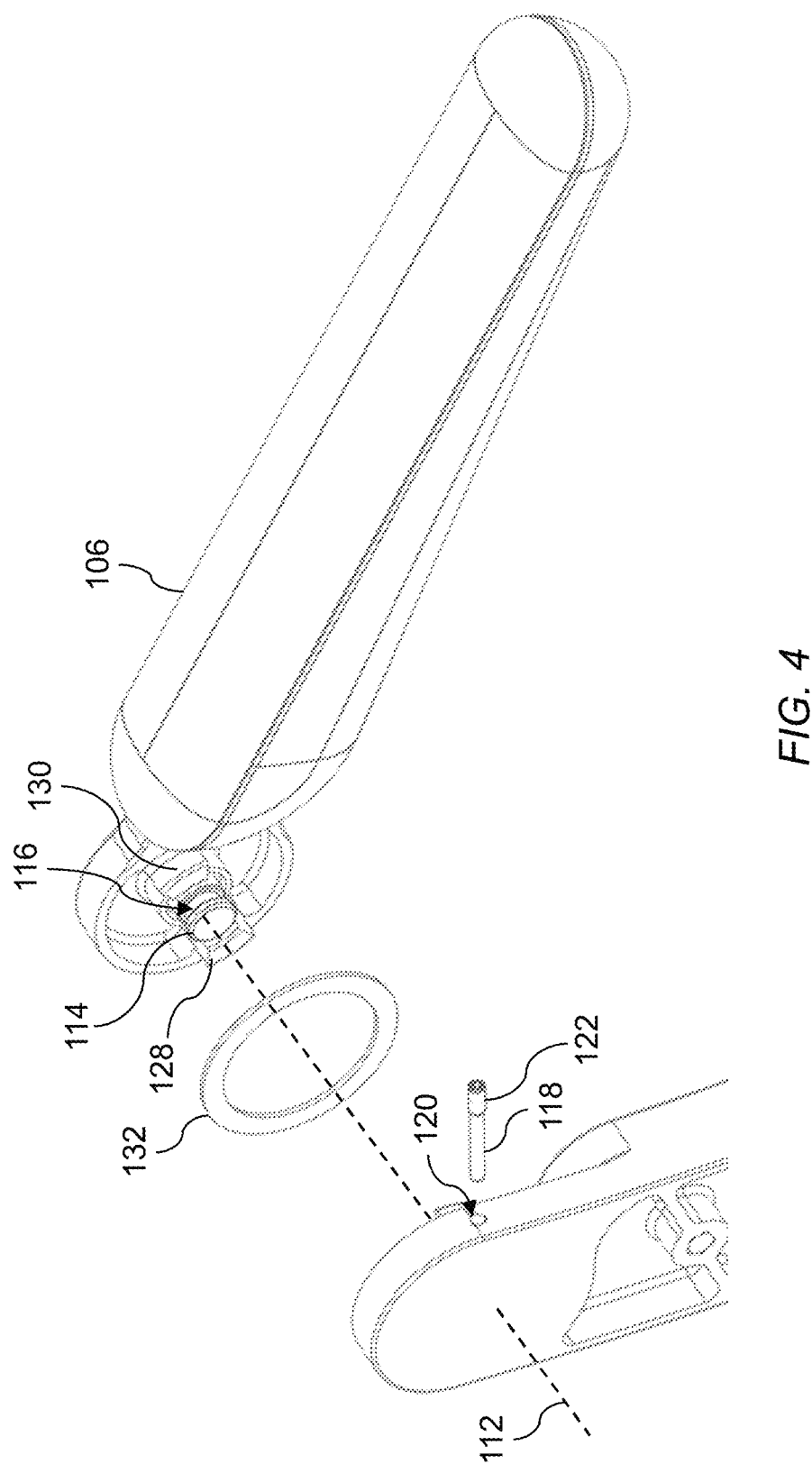
FIG. 4 is an exploded perspective view of the armrest assembly illustrating the pivot block.

Referring to FIGS. 3 and 4, the fixed support member 102 defines an upper end configured to attach the pivot block 104. Half of the thickness of the uppermost portion of the assembly is attributable to the thickness of the fixed support member 102, while the other half is attributable to the thickness of the pivot block 104, in substantially equal thickness or halves, such that the total thickness of the uppermost portion of the assembly is low profile and substantially equal to the thickness of lower portions of the fixed support member 102. A ledge 108 defined proximate the upper end of the fixed support member 102 is contoured to complement the contouring of the of the pivot block, and in some cases may function as a mechanical stop to prevent further downward pivoting of the armrest. As shown, the forward end of the ledge 108 contours away from the overlying armrest to preclude a finger pinch when the armrest is in downward-most position.

A bore 110 provided on one side of the fixed support member 102 opens toward the pivot block 104 and defines a horizontal axis of rotation of the armrest shown at reference numeral 112. The bore 110 receives a concentric shaft 114 provided on the facing side of the pivot block 104. The shaft 114 rotatably engages the bore 110. The shaft 114 defines an annular groove 116 at one end configured to receive a portion of a retention pin 118 retaining the pivot block 104 to the fixed support member 102. A second, smaller diameter bore 120 opens on one side of the fixed support member 102. In some embodiments, the externally threaded retention pin 118 is threadably engaged in the internally threaded second bore 120. The retention pin 118 may include a head 122 forming a tool pattern configured to receive a corresponding tool for advancing and withdrawing the retention pin relative to the opening, such as a hex or star pattern.

Each of the fixed support member 102 and the pivot block 104 define stop blocks that interact, mate or otherwise engage to control rotation of the pivot block 104 relative to the fixed support member 102. As shown in FIG. 3, the fixed support member 102 is provided with separate first and second stop blocks 124, 126 diametrically opposed about the bore 110. As shown in FIG. 4, the pivot block 104 is provided with corresponding first and second stop blocks 128, 130 diametrically opposed about the shaft 114. With the pivot block 104 rotatably coupled to the fixed support member 102, the first and second stop blocks 124, 126 of the fixed support member 102 and the first and second stop blocks 128, 130 of the pivot block 104 are interdigitated such that stop block 128 is positioned between one side of stop blocks 124 and 126, and stop block 130 is positioned between the opposing side of stock bocks 124 and 126.

Each stop block 124, 126, 128, 130 defines opposing faces. In use, when the armrest is pivoted fully downward, stock block 130 engages stop block 124 and stop block 128 engages stop block 126 thereby preventing further downward pivoting. When the armrest is pivotally fully upward, stop block 130 engages stop block 126 and stop block 128 engages stop block 124 thereby preventing further upward pivoting. The amount of rotation of the pivot block 104 relative to the fixed support member 102, and consequently the angular travel of the armrest, can be customized based one or more of the relative positions of the stop blocks, spacing between stop blocks, dimensions of the stop blocks, etc. In each of the fully lowered and fully raised positions of the armrest, the first and second stop blocks 128, 130 of the pivot block 104 preferably simultaneously engage the first and second stop blocks 124, 126 of the fixed support member 102 for stability.

In some embodiments, a friction-enhancing or friction-reducing washer 132 is positioned concentric with the bore 110 and shaft 114. One face of the washer 132 faces and engages the fixed support member 102 while the opposing face faces and engages the pivot block 104. An inner diameter of the washer 132 is dimensioned such that the washer is positioned radially outward of the stop blocks 124, 126, 128, 130, while the outer diameter of the washer is dimensioned to fit within the bounds of the pivot block 104 and fixed support member 102, thereby substantially concealing the washer from view.

Figure 5:
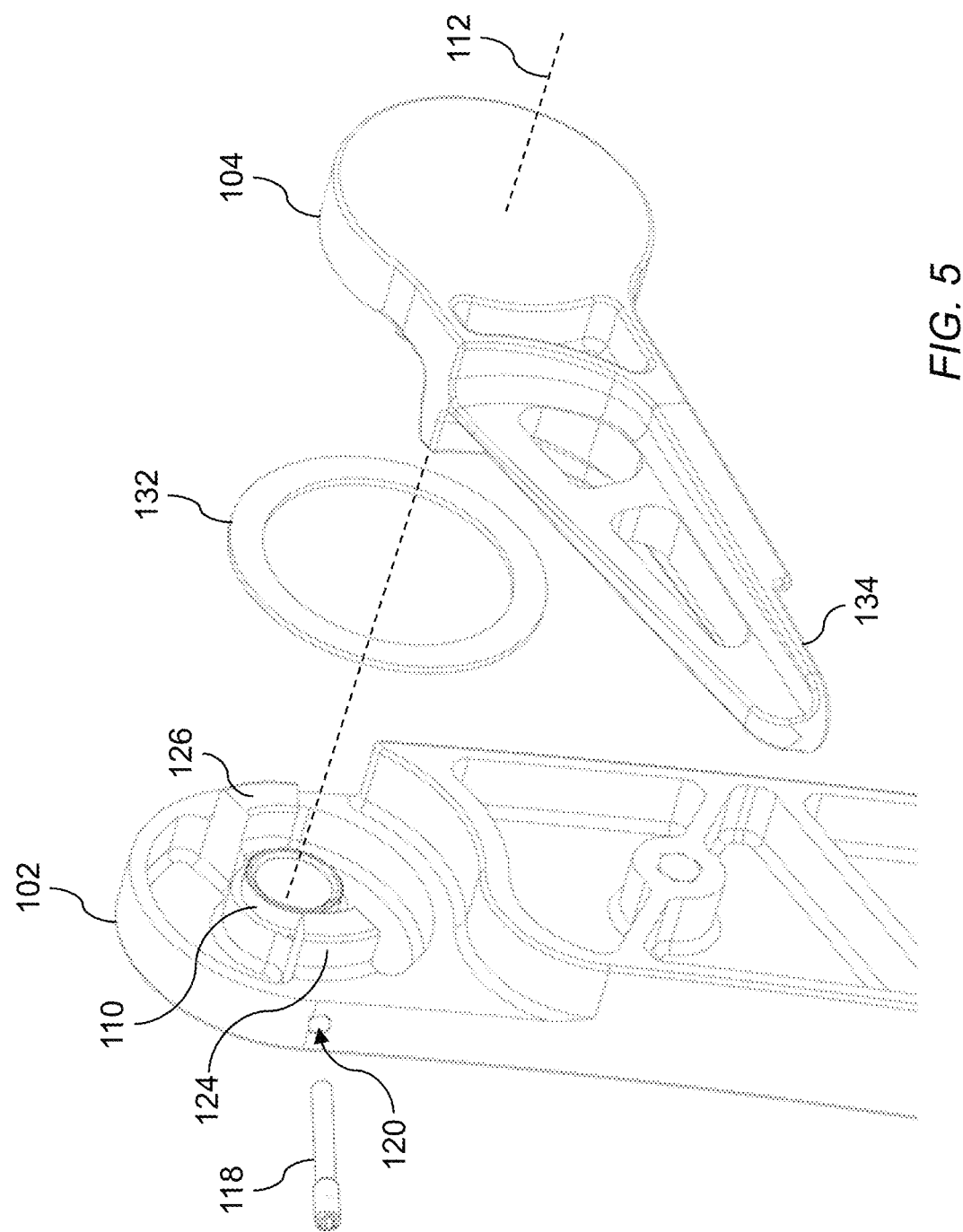
FIG. 5 is an exploded perspective view of the armrest assembly illustrating the pivot block features and retention pin.

Referring to FIG. 5, a first end of the pivot block 104 forms the portion configured to rotatably engage the fixed support member 102, while the second end forms an elongated support member 134 for attaching the armrest. In some embodiments, the first and second ends of the pivot block 104 are integrally formed.

Figure 6:
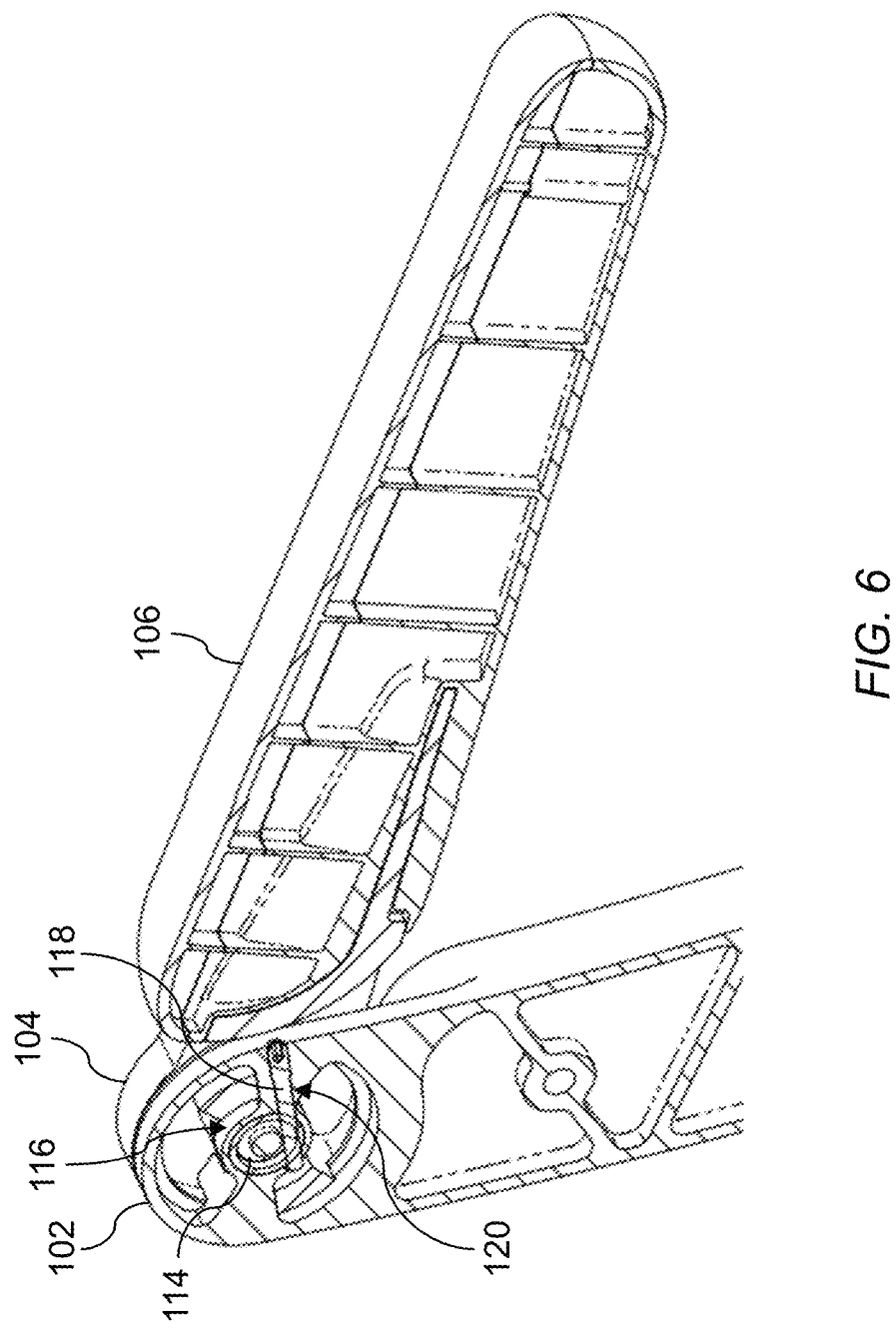
FIG. 6 is a longitudinal cross-section through the armrest assembly illustrating stop block interdigitation and the concealed position of the retention pin.

Referring to FIG. 6, the retention pin 118 retains the pivot block 104 to the fixed support member 102. The second bore 120 is positioned such that the retention pin 118 is installed through the fixed support member 102 perpendicular to the axis of rotation 112. When installed, a portion of the retention pin 118 is disposed in the annular groove 116 formed in the shaft 114 of the pivot block 104. As shown, the shaft 114 advances into the bore of the fixed support member such that the annular groove 116 is positioned at the inner opening of the second bore 120. In this position, the retention pin 118 passes through the annular groove 116, tangentially, thereby preventing the pivot block 104 from being pulled apart from the fixed support member 102. The tangential orientation of the retention pin 118 prevents axial movement of the shaft 114 while allowing rotational movement. To detach the pivot block 104 from the fixed support member 102, the retention pin 118 is withdrawn until the retention pin is clear of the annular groove 114, allowing the pivot block 104 to be pulled apart from the fixed support member 102.

Figure 7:
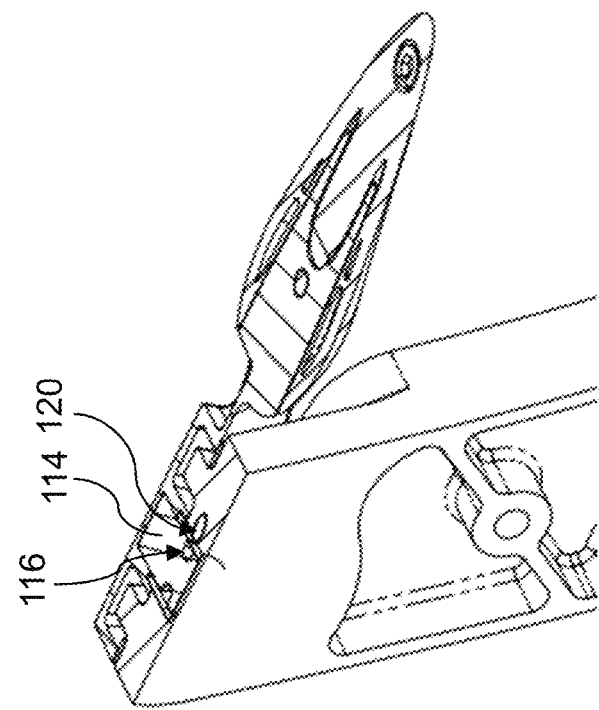
FIG. 7 is a sectional view through a top portion of the fixed support member illustrating the pivot block shaft and stop block features.

Referring to FIGS. 7 and 8, fasteners 136 securing the armrest 106 to the pivot block 102 are provided on the bottom of the armrest to conceal the fasteners from view when the armrest is lowered. In addition, the second bore 120 is concealed from view beneath the armrest 126 when the armrest if lowered. As such, the single fastener retaining the pivot block 104, and thus the armrest 106, to the fixed support member 102 is concealed from view beneath the lowered armrest to conceal the retention pin and pivot point.

In use, the armrest assembly permits the position of the armrest to be smoothly adjusted by pivoting at the rotation axis. Upon raising the armrest to a vertical position, friction should prevent the armrest from returning to a lower position even under turbulent conditions of air travel. The retained upper and lower conditions of the armrest are determined by the integral stop blocks. Intermediate positions of the armrest can be achieved using compatible mechanisms.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. An armrest assembly, comprising:
    a fixed support member provided with a bore defining an axis of rotation;
    a pivot block provided with a shaft rotatably engaging the bore;
    an armrest coupled to the pivot block;
    a retention pin retaining the pivot block to the fixed support member, the retention pin installed through the fixed support member, perpendicular to the axis of rotation, and received in an annular groove formed in the shaft of the pivot block; and
    the fixed support member and the pivot block provided with mating stop blocks configured to limiting pivoting of the pivot block relative to the fixed support member.

2. The armrest assembly according to claim 1, wherein:
    the fixed support member is provided with separate stop blocks diametrically opposed about the bore;

the pivot block is provided with separate stop blocks diametrically opposed about the shaft;

the stop blocks of the pivot block are configured to engage the stop blocks of the fixed support member in a first configuration to prevent further upward pivoting of the pivot block relative to the fixed support member; and the stop blocks of the pivot block are configured to engage the stop blocks of the fixed support member in a second configuration to prevent further downward pivoting of the pivot block relative to the fixed support member.

3. The armrest assembly according to claim 2, wherein the stop blocks of the pivot block and the stop blocks of the fixed support member are interdigitated.

4. The armrest assembly according to claim 3, further comprising a washer disposed between the fixed support member and the pivot block, the washer positioned radially outward of the interdigitated stop blocks of the pivot block and the fixed support member.

5. The armrest assembly according to claim 1, wherein the fixed support member is a spreader defining opposing sides and the pivot block is positioned against one of the opposing sides.

6. The armrest assembly according to claim 1, further comprising an internally threaded bore formed in the fixed support member, wherein the retention pin is externally threaded and theadably engages in the internally threaded bore.

7. The armrest assembly according to claim 6, wherein an opening to the internally threaded bore is positioned below the armrest such that the retention pin, when installed, is concealed from view when the armrest is fully lowered.

8. The armrest assembly according to claim 1, wherein the pivot block is configured to rotate relative to the fixed support member to move the armrest between a first position in which the armrest is substantially horizontal and a second position in which the armrest is substantially vertical.

9. An armrest assembly for use with an aircraft passenger seat, comprising:

a fixed spreader provided with a bore positioned proximate an upper end of the fixed spreader, the bore defining an axis of rotation;

a pivot block provided with a shaft rotatably engaging the bore;

an armrest coupled to the pivot block;

a retention pin retaining the pivot block to the fixed spreader, the retention pin installed through the fixed spreader, perpendicular to the axis of rotation, and received in an annular groove formed in the shaft of the pivot block; and the fixed spreader and the pivot block provided with mating stop blocks limiting pivoting of the pivot block relative to the fixed spreader.

10. The armrest assembly according to claim 9, wherein:

the fixed spreader is provided with separate stop blocks diametrically opposed about the bore;

the pivot block is provided with separate stop blocks diametrically opposed about the shaft;

the stop blocks of the pivot block are configured to engage the stop blocks of the fixed spreader in a first configuration to prevent further upward pivoting of the pivot block relative to the fixed spreader; and the stop blocks of the pivot block are configured to engage the stop blocks of the fixed support member in a second configuration to prevent further downward pivoting of the pivot block relative to the fixed spreader.

11. The armrest assembly according to claim 10, wherein the stop blocks of the pivot block and the stop blocks of the fixed spreader are interdigitated, and wherein the armrest assembly further includes a washer disposed between the fixed spreader and the pivot block positioned radially outward of the interdigitated stop blocks of the pivot block and the fixed spreader.

12. The armrest assembly according to claim 9, wherein the pivot block is positioned to one side of the fixed spreader.

13. The armrest assembly according to claim 9, further comprising an internally threaded bore formed in the fixed spreader, wherein the retention pin is externally threaded and theadably engages in the internally threaded bore.

14. The armrest assembly according to claim 13, wherein an opening to the internally threaded bore is positioned below the armrest such that the retention pin, when installed, is concealed from view when the armrest is fully lowered.

15. The armrest assembly according to claim 9, wherein the pivot block is configured to rotate relative to the fixed spreader to move the armrest between a first position in which the armrest is substantially horizontal and a second position in which the armrest is substantially vertical.

* * * * *